United States Patent
Mills et al.

(10) Patent No.: US 6,840,034 B2
(45) Date of Patent: Jan. 11, 2005

(54) EMISSION CONTROL APPARATUS FOR MARINE GENERATOR ENGINE

(75) Inventors: Michael Mills, Matthews, NC (US); David James, Mooresville, NC (US)

(73) Assignee: Envirolift, LLC, Mooresville, NC (US)

( * ) Notice: Subject to any disclaimer, the term of this patent is extended or adjusted under 35 U.S.C. 154(b) by 0 days.

(21) Appl. No.: 10/434,911

(22) Filed: May 9, 2003

(65) Prior Publication Data

US 2003/0209008 A1 Nov. 13, 2003

Related U.S. Application Data

(63) Continuation-in-part of application No. 10/126,561, filed on Apr. 19, 2002, now Pat. No. 6,604,356.

(51) Int. Cl.[7] .................................................. E01N 3/00
(52) U.S. Cl. ............................... 60/275; 60/274; 60/298; 60/300; 60/320; 422/186.02; 422/186.04; 422/186.19; 422/186.21; 422/186.22
(58) Field of Search .......................... 60/274, 275, 289, 60/293, 298, 300, 303, 320; 422/186.02, 186.03, 186.04, 186.15, 186.18, 186.19, 186.21, 186.22

(56) References Cited

U.S. PATENT DOCUMENTS

| | | | |
|---|---|---|---|
| 3,228,755 A | 1/1966 | Lottinville | |
| 3,263,412 A | 8/1966 | Thompson | |
| 3,846,637 A | 11/1974 | Gettinger | |
| 4,183,212 A | 1/1980 | Takagi | |
| 4,199,938 A | 4/1980 | Nakase et al. | |
| 4,484,444 A | 11/1984 | Bidwell | |
| 4,488,400 A | 12/1984 | Eddy | |
| 4,503,671 A | 3/1985 | Smith | |
| 5,167,934 A | 12/1992 | Wolf et al. | |
| 5,366,701 A | 11/1994 | Taylor et al. | |
| 5,410,871 A | 5/1995 | Masters et al. | |
| 5,419,123 A | 5/1995 | Masters | |
| 5,425,232 A | 6/1995 | Holtermann | |
| 5,444,975 A | 8/1995 | Gohre et al. | |
| 5,809,773 A | 9/1998 | Gottberg | |
| 5,855,855 A | 1/1999 | Williamson et al. | |
| 5,953,909 A | 9/1999 | Waltrip, III | |
| 6,027,616 A | 2/2000 | Babko-Malyi | |
| 6,058,698 A | 5/2000 | Coral et al. | |
| RE36,888 E | 10/2000 | Sougawa et al. | |
| 6,168,689 B1 * | 1/2001 | Park et al. | 204/164 |
| 6,253,544 B1 | 7/2001 | Miller et al. | |
| 6,330,794 B1 | 12/2001 | Caren et al. | |
| 6,604,356 B1 * | 8/2003 | Mills et al. | 60/275 |

OTHER PUBLICATIONS

Envirolift, LLC, "Enviromarine Systems Carbon Monoxide Reduction System"; published Jun. 2001 in U.S.

* cited by examiner

*Primary Examiner*—Binh Q. Tran
(74) *Attorney, Agent, or Firm*—Adams Evans P.A.

(57) ABSTRACT

An apparatus for reducing pollutants in internal combustion engine emissions, particularly marine electric generator engines, includes a treatment chamber having an intake opening for receiving gaseous emissions from the engine, and an exhaust opening for exiting emissions. A perforated metal tube is disposed within the treatment chamber, and an electrode is disposed within the metal tube in spaced apart relation to the metal tube. The electrode is encircled by the metal tube so that, upon applying a voltage at a predetermined frequency to the electrode, an arc is generated across the space between the electrode and the metal tube to promote a chemical reaction reducing the concentration of pollutants. The treatment chamber is contained within a manifold, and cooled by a flow of water. A supplemental air source is connected to the treatment chamber, and a chemical substrate is disposed within the treatment chamber for promoting the chemical reaction.

22 Claims, 10 Drawing Sheets

EMISSION CONTROL APPARATUS FOR MARINE GENERATOR ENGINE

TECHNICAL FIELD AND BACKGROUND OF THE INVENTION

This application is a continuation in part of prior application Ser. No. 10/126,561, filed Apr. 19, 2002 now U.S. Pat. No. 6,604,356.

The invention relates to an apparatus for reducing the concentration of pollutants in the exhaust emissions of an internal combustion engine, particularly an engine driving an electric generator on a boat. The invention is particularly adapted for connecting to the exhaust manifold of a marine electric generator engine.

It is well known that internal combustion engines produce an exhaust emission containing pollutants that are harmful to the environment. Such pollutants include carbon monoxide, carbon dioxide and various hydrocarbons. There are many inventions for reducing the concentration of such pollutants in engine exhaust emissions. For example, U.S. Pat. Nos. 5,410,871 and 5,419,123 each disclose emission control devices particularly suited for reducing pollutant levels in automobile exhaust emissions.

Pollution control for marine electric generator engines presents a unique set of challenges that have not been sufficiently addressed by the prior art. Houseboats and large cruisers typically have an electric generator for powering air conditioning, stereos, appliances and the like. Electricity is generated by a conventional internal combustion engine that produces an exhaust emission containing a relatively high concentration of pollutants. Typically, the concentration of pollutants is higher than that given off by automobile engines due to the lack of anti-pollution equipment generally required in automobile engines.

Such marine generators are commonly operated when the boat is stationary, and thus the pollutants are emptied into a single concentrated area in the water that is proximate to where people may be swimming. The collection of toxic pollutants such as carbon monoxide near swimmers, particularly children, presents a potentially life-threatening situation making effective pollution control of marine generator engines critical. Conventional catalytic converters used on automobiles reach extremely hot temperatures of over 1000° Fahrenheit, which is too high for safe use on a boat where the risk of fire is of more paramount concern. Other emission control devices, such as the ones disclosed in U.S. Pat. Nos. 5,410,871 and 5,419,123 operate at cooler temperatures, but still reach over 300° Fahrenheit, which presents a danger of overheating and fire. The danger of fire on a boat is just as life-threatening as the presence of poisonous gases, and therefore a pollution control device for a marine generator engine must be highly resistant to overheating as well as extremely effective in reducing poisonous gases. Furthermore, pollution control for a marine generator engine requires a device that is capable of eliminating the substantially higher concentrations of pollutants contained in the gaseous emissions of marine generator engines.

In an effort to overcome and eliminate the aforementioned problems, the present invention was conceived.

SUMMARY OF THE INVENTION

Therefore it is an object of the present invention to provide an apparatus and method for reducing the relatively high concentration of pollutants in the exhaust emissions of marine electric generator engines.

It is another object of the invention to provide an apparatus resistant to overheating that is capable of reducing the concentration of pollutants in the exhaust emissions of an internal combustion engine.

It is yet another object of the present invention to provide a pollution control apparatus that can be mated with a marine electric generator.

These and other objectives of the present invention are achieved by providing an apparatus for reducing pollutants in internal combustion engine emissions having a treatment chamber including an intake opening and an exhaust opening at opposing lateral ends of the treatment chamber. The intake opening receives a stream of gaseous emissions from the engine, which exits from the treatment chamber through the exhaust opening. A metal tube is disposed within the treatment chamber, and an electrode is disposed within the metal tube in spaced apart relation to the metal tube. The electrode is encircled by the metal tube so that, upon applying a voltage to the electrode, an arc is generated across the space between the electrode and the metal tube, the metal tube providing potential points of contact for the arc around the periphery thereof. The arc is generated from the electrode to the metal tube at a predetermined frequency to promote a chemical reaction that reduces the concentration of pollutants in the stream within the treatment chamber.

According to a preferred embodiment of the invention, a voltage source is operatively connected to the electrode and a pulsing mechanism is operatively configured with the voltage source to cause the voltage supplied to the electrode to be pulsed at the predetermined frequency.

According to another preferred embodiment of the invention, the metal tube is perforated to allow passage of the stream of gaseous emissions therethrough, and the electrode comprises a threaded rod.

According to yet another preferred embodiment of the invention, the apparatus includes an outer chamber having first and second openings at opposing lateral ends of the outer chamber. The outer chamber includes an inlet port for receiving a flow of water and an outlet port for exiting the flow of water. At least a portion of the treatment chamber is contained within the outer chamber, and the treatment chamber is positioned such that the intake opening is linearly aligned with the first opening and the exhaust opening is linearly aligned with the second opening. The treatment chamber and the outer chamber define a space between in which the flow of water cools the treatment chamber. A water supply connected to the inlet port for introducing the flow of water into the outer chamber.

According to yet another preferred embodiment of the invention, an intake pipe is connected to the treatment chamber proximate the intake opening to engage an exhaust manifold of a marine electric generator engine and receive the stream of gaseous emissions exiting the exhaust manifold.

According to yet another preferred embodiment of the invention, a supplemental air source is connected to the intake pipe for supplying air to dilute the stream of gaseous emissions within the apparatus.

According to yet another preferred embodiment of the invention, the apparatus is configured to be mateable with an exhaust apparatus of an electric generator engine on a houseboat.

According to yet another preferred embodiment of the invention, the supplemental air source includes an air pump mounted in place of the generator engine's alternator, and it is belt driven by a crankshaft on the generator engine.

According to yet another preferred embodiment of the invention, the apparatus includes a treatment chamber having an intake opening and an exhaust opening at opposing lateral ends of the treatment chamber, and a metal tube disposed within the treatment chamber. An electrode is disposed within the metal tube in spaced apart relation to the metal tube, and the electrode is encircled by the metal tube so that, upon applying a voltage to the electrode, an arc is generated across the space between the electrode and the metal tube. The metal tube provides potential points of contact for the arc around its periphery. The arc is generated from the electrode to the metal tube at a predetermined frequency to promote a chemical reaction reducing the concentration of pollutants in the stream within the treatment chamber. An intake pipe is connected at one end to the treatment chamber proximate the intake opening, and connected at the other end to a flange that mateably engages a segment of the exhaust manifold of the engine.

According to yet another preferred embodiment of the invention, the apparatus is configured to be mateable with an exhaust apparatus of an electric generator engine on a houseboat.

According to yet another preferred embodiment of the invention, the apparatus includes a treatment chamber having an intake opening and an exhaust opening at opposing lateral ends of the treatment chamber, and a metal tube disposed within the treatment chamber. An electrode is disposed within the metal tube in spaced apart relation to the metal tube, and the electrode is encircled by the metal tube so that, upon applying a voltage to the electrode, an arc is generated across the space between the electrode and the metal tube. The metal tube provides potential points of contact for the arc around its periphery. The arc is generated from the electrode to the metal tube at a predetermined frequency to promote a chemical reaction reducing the concentration of pollutants in the stream within the treatment chamber. An intake pipe is connected to the treatment chamber proximate the intake opening, and is telescopically positioned over a segment of the exhaust manifold of the engine to receive the stream of gaseous emissions exiting the engine through the exhaust manifold.

According to yet another preferred embodiment of the invention, the apparatus includes a U-shaped bolt clamp for positioning about the intake pipe and tightening the intake pipe against the exhaust manifold.

According to yet another preferred embodiment of the invention, the apparatus is configured to be mateable with an exhaust apparatus of a marine electric generator engine.

According to yet another preferred embodiment of the invention, a supplemental air source is connected to the engine exhaust manifold to supply air for diluting the stream of gaseous emissions exiting the engine through the exhaust manifold.

According to yet another preferred embodiment of the invention, the apparatus is configured to be mateable with an exhaust apparatus of an electric generator engine on a small or mid-sized boat, and the supplemental air source includes an air pump powered by a voltage provided by the generator.

According to yet another preferred embodiment of the invention, an exhaust pipe is connected to the treatment chamber proximate the exhaust opening for exhausting the stream of gaseous emissions from the treatment chamber. The exhaust pipe includes an inlet port for receiving a flow of water for mixing with the stream of gaseous emissions exiting through the exhaust pipe.

According to yet another preferred embodiment of the invention, a tube connects the outlet port of the outer chamber to the inlet port of the exhaust pipe for delivering the flow of water into the exhaust pipe.

A preferred method for reducing pollutants in internal combustion engine emissions according to the invention comprises the steps of providing an apparatus including a treatment chamber having an intake opening and an exhaust opening, and a metal tube disposed within the treatment chamber. An electrode is disposed within the metal tube in spaced apart relation to the metal tube. The electrode is encircled by the metal tube so that, upon applying a voltage to the electrode, an arc is generated across the space between the electrode and the metal tube. The metal tube provides potential points of contact for the arc around its periphery. The arc is generated from the electrode to the metal tube at a predetermined frequency to promote a chemical reaction reducing the concentration of pollutants in the stream within the treatment chamber. The intake opening is connected to an exhaust manifold of the engine so that a stream of gaseous emissions passes from the exhaust manifold through the intake opening into the treatment chamber. A supplemental stream of air is supplied to the treatment chamber for diluting the stream of gaseous emissions within the treatment chamber. A voltage is pulsed at a predetermined frequency to the electrode to generate the chemical reaction with the stream of gaseous emissions as the stream passes proximate the metal tube to reduce the concentration of pollutants in the stream.

According to another preferred embodiment of a method for reducing pollutants in the gaseous emissions, an intake pipe is connected to the treatment chamber proximate the intake opening, and is telescopically positioned over a segment of the exhaust manifold.

According to yet another preferred embodiment of a method for reducing pollutants in the gaseous emissions, a U-bolt clamp is positioned about the intake pipe and tightened to frictionally engage the intake pipe against the exhaust manifold.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
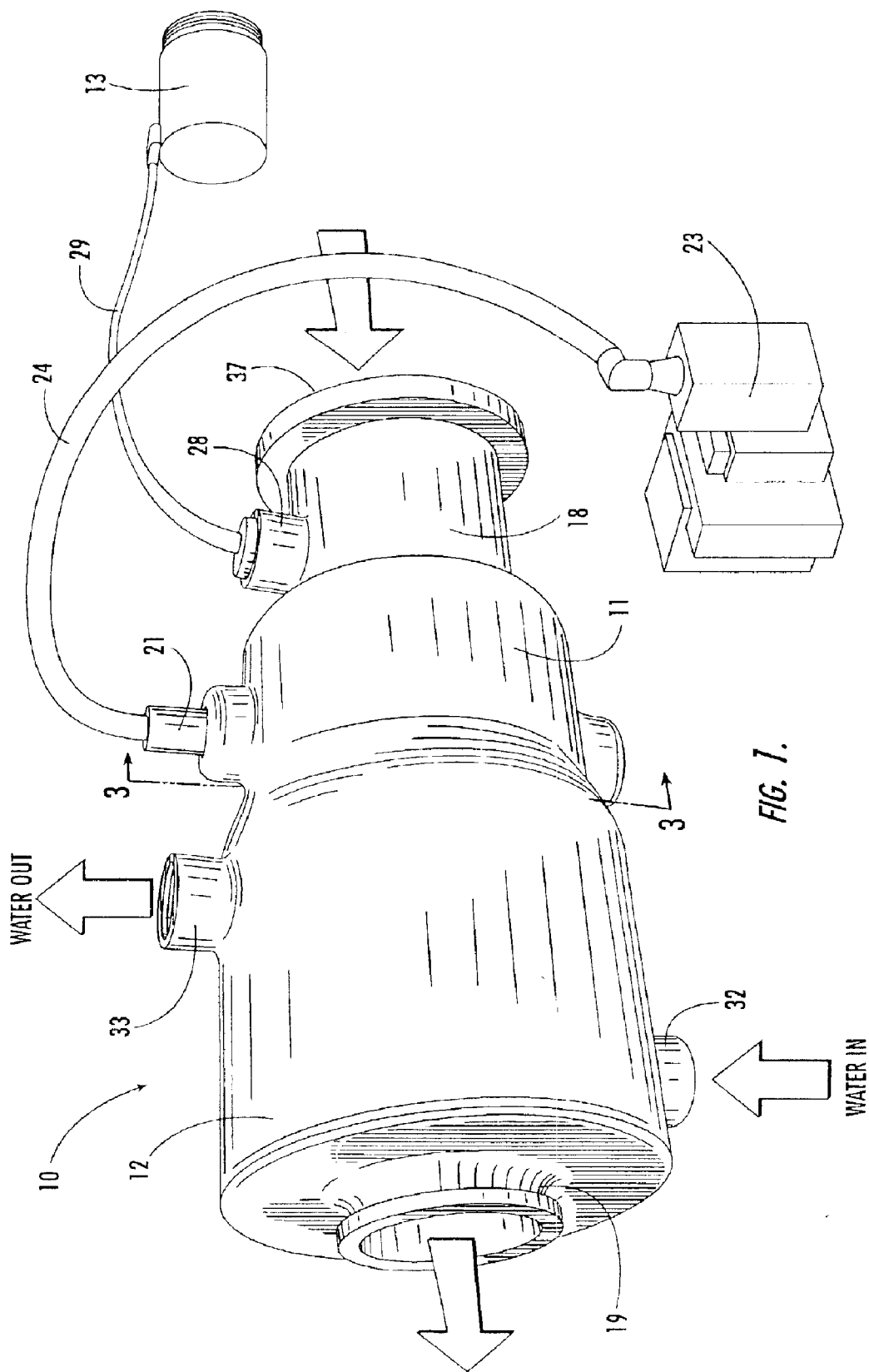
FIG. 1 is a perspective view of a preferred emission control apparatus according to the invention.
Figure 2:
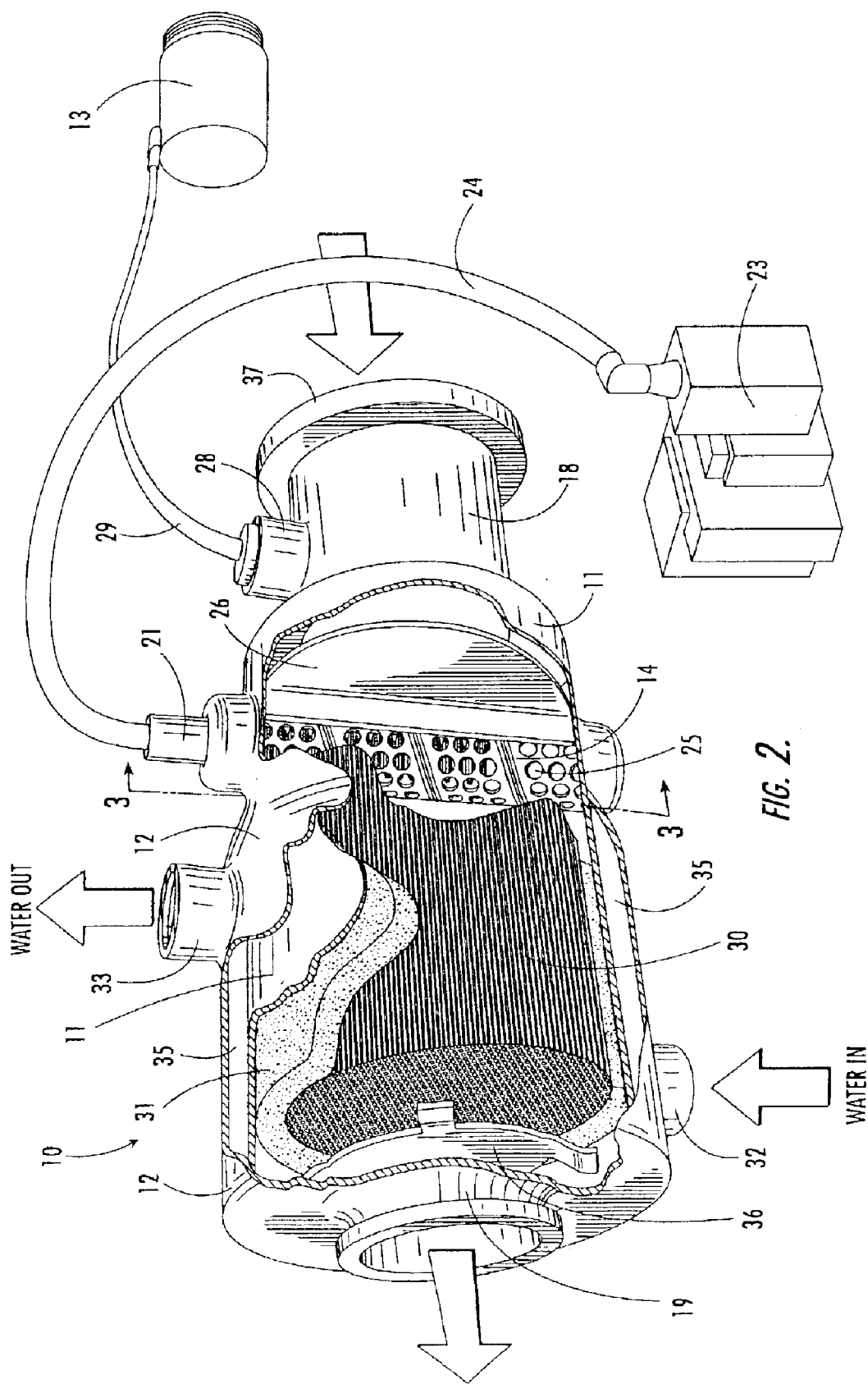
FIG. 2 is a partial cut-away view of the preferred emission control apparatus shown in FIG. 1.

Referring now specifically to the drawings, a preferred embodiment of the emission control apparatus according to the present invention is illustrated in FIG. 1, and shown generally at reference numeral 10. As can be seen in FIG. 2, the emission control apparatus 10 comprises a treatment chamber 11 positioned within a manifold 12, and an air pump 13. A metal tube 14 containing an electrode 15, and a porous chemical substrate 16 are positioned within the treatment chamber 11 to promote a chemical reaction that reduces the concentration of pollutants in the gaseous emissions of a conventional marine electric generator engine 17, shown in FIG. 8.

Figure 8:
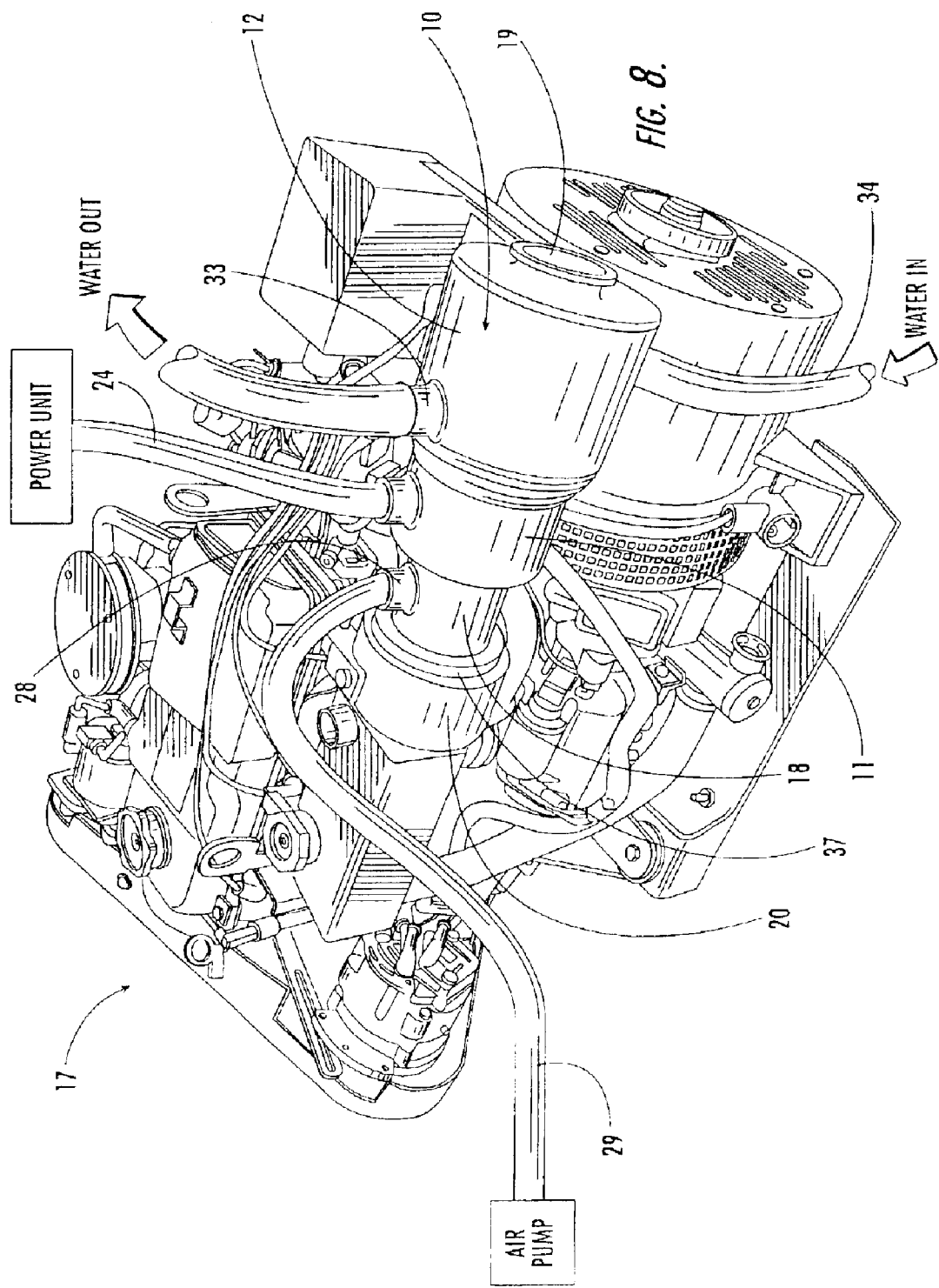
FIG. 8 is an environmental view of the preferred emission control apparatus shown in FIG. 1.

As shown in FIG. 1, the treatment chamber 11 is a hollow cylinder, preferably made of 316 L stainless steel. The treatment chamber 11 includes an intake pipe 18 and an exhaust pipe 19 located at opposite lateral ends of the treatment chamber 11 that define openings through which a stream of gaseous emissions enters and exits the treatment chamber 11, respectively. The intake pipe 18 is attached to the exhaust manifold 21 of the marine generator engine 17, as shown in FIG. 8. The marine generator engine 17 generates electricity by an internal combustion that produces gaseous emissions containing a high concentration of environmental pollutants such as carbon monoxide and various hydrocarbons. The gaseous emission stream is expelled from the engine 17 through its exhaust manifold 20 and enters the emission control apparatus 10 through the intake pipe 18, which has a flange 37 mounted thereon for engaging the exhaust manifold 20. The gaseous emission stream flows through the treatment chamber 11 and exits through the exhaust pipe 19.

Figure 3:
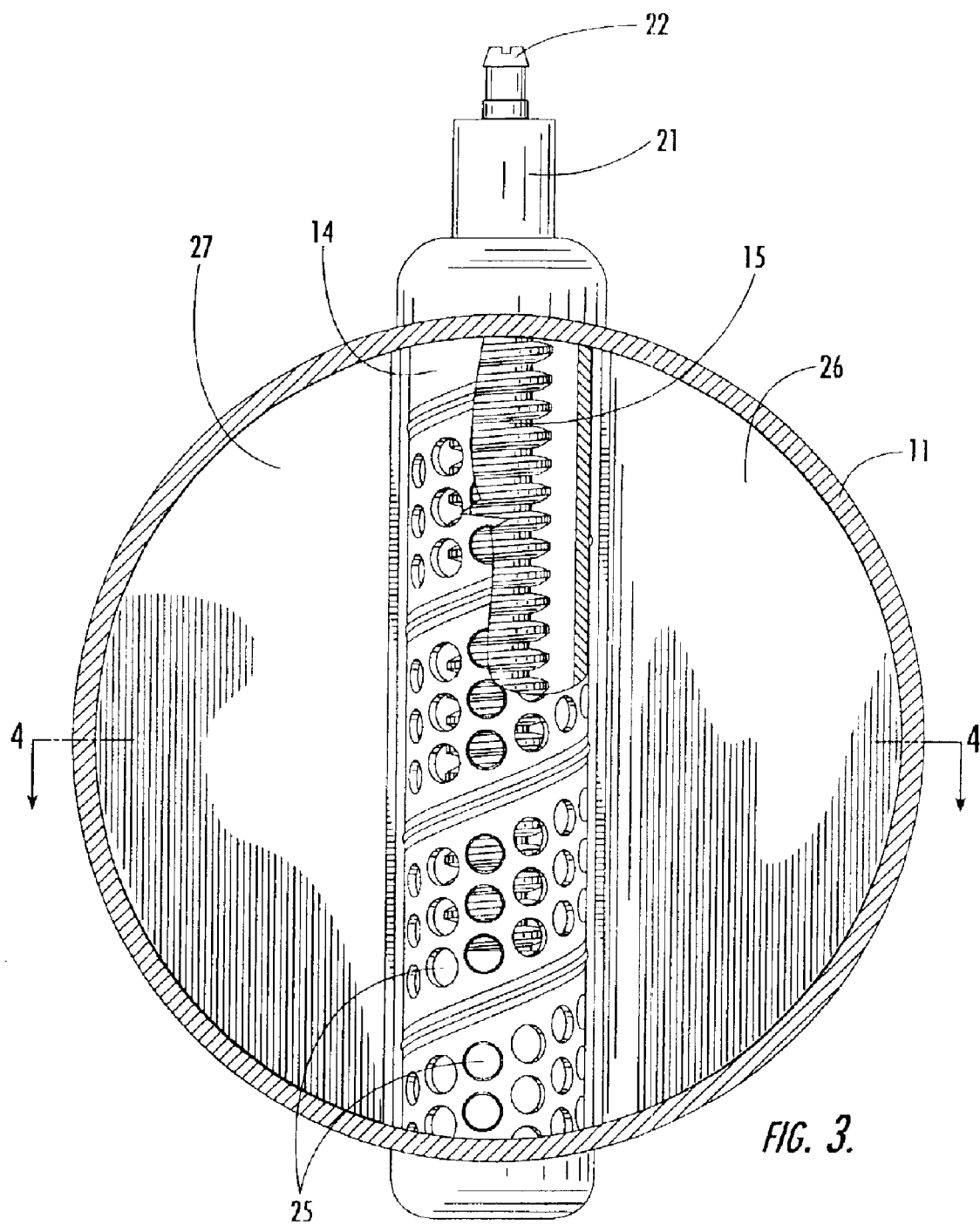
FIG. 3 is a cross sectional view of the preferred emission control apparatus shown in FIG. 1 along lines 3—3.
Figure 4:
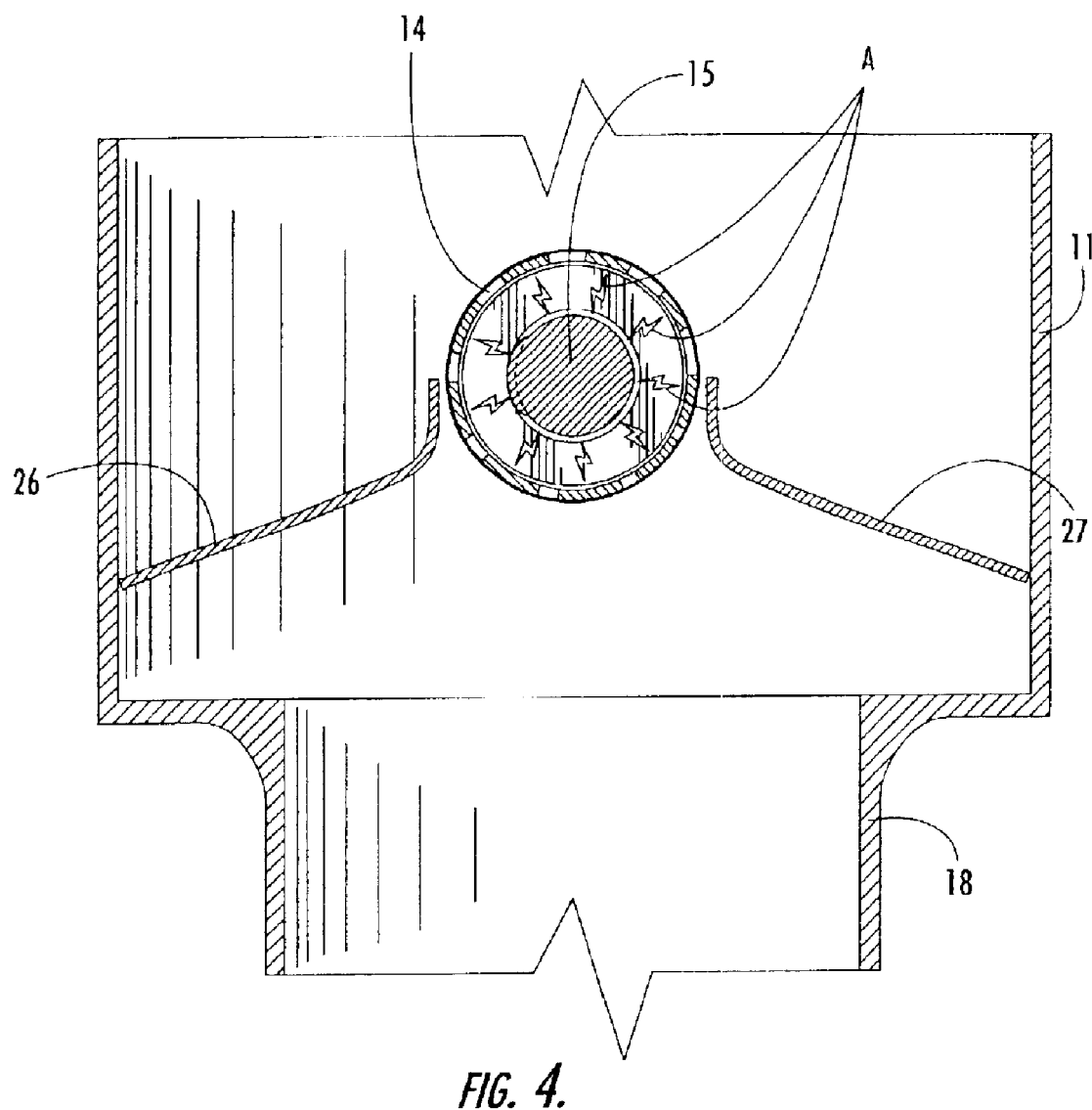
FIG. 4 is a partial cross sectional view of the preferred emission control apparatus shown in FIG. 3 along lines 4—4.

As shown in FIGS. 2–5, a cylindrical metal tube 14 is disposed within the treatment chamber 11 downstream from the intake pipe 18. The metal tube 14 is positioned perpendicularly to the longitudinal axis of the treatment chamber 11. The metal tube 14 and the electrode 15 are preferably made of 316 L stainless steel. As can best be seen in FIG. 3, the electrode 15 is an elongate threaded rod extending through the center of the metal tube 14, and is perpendicular to the longitudinal axis of the treatment chamber 11. A portion of the electrode 15 protrudes upward through an opening in the treatment chamber 11 and is disposed within a ceramic insulator 21. A threaded ignitor cap 22 is affixed on the top of the electrode 15, which extends above the ceramic insulator 21. The electrode 15 is operatively connected to a power unit 23 by a cord 24. The power unit 23 is connected to the electrical apparatus of the marine generator engine 17 and supplies a voltage to the electrode 15 that generates electric arcing "A" across the space between the electrode 15 and metal tube 14, as shown in FIG. 4. Because the electrode 15 is encircled by the metal tube 14, there is arcing "A" in all directions from the electrode 15 to the metal tube 14 upon suppling the voltage to the electrode 15. The cord 24 is connected to the electrode 15 by the cap 22. The electrode 15 is threaded to increase the surface area from which the electric arcing "A" is generated. The metal tube 14 is perforated throughout with a plurality of holes 25 to facilitate passage of the stream of gaseous emissions through the metal tube 14. The voltage supplied by the power unit 23 is pulsed at a frequency that has been predetermined to maximize the reduction of pollutants contained in the gaseous emission stream within the treatment chamber 11. The preferred voltage is 15,000 volts and the preferred frequency is 1500 pulses per minute. The power unit 23 is similar in design and function to the AC voltage source described in U.S. Pat. No. 5,410,871 for an "Emission Control Device and Method" (column 5, line 40 to column 6, line 59), which is incorporated herein, and therefore is not described in detail.

It is believed that the electric arcing "A" generated from the electrode 15 excites metal atoms on the surface of the metal tube 14 causing a metallic catalyst reaction between the metal atoms and the molecules of pollutants contained in the gaseous emission stream. This reaction reduces the concentration of pollutants in the gaseous emission stream. For instance, a substantial portion of carbon monoxide is broken down into free carbon and oxygen. For a further explanation of the reaction, applicant references U.S. Pat. No. 5,410,871 (column 7, lines 1–30), which is incorporated herein.

The holes 25 of the metal tube 14 and the threaded surface of the electrode 15 increase the efficiency of the reaction. In addition, two baffles 26, 27 are positioned perpendicularly to the longitudinal axis of the treatment chamber 11 on each side of the metal tube 14, as shown in FIGS. 3 and 4. The baffles 26, 27 are oriented at forty-five degree angles relative to the metal tube 14 and channel the stream of gaseous emissions directly to the metal tube 14 and electrode 15. This minimizes the amount of gaseous pollutants passing through the apparatus without undergoing the voltage induced reaction and maximizes efficiency of the apparatus.

As shown in FIGS. 1 and 2, the intake pipe 18 includes an air intake port 28 for connecting a tube 29 from an air pump 13, which is mounted on the generator engine 17 in place of the alternator. A trickle charge device can be used in place of the alternator on the generator engine 17. The air pump 13 is belt driven by the crank shaft of the generator engine 17. The air pump 13 supplies a supplemental air source to the treatment chamber 11 diluting the gaseous emission stream. The air pump 13 preferably supplies air at a rate of fifteen to twenty-three cubic feet per minute. It is believed that the additional oxygen provided by the supplemental air facilitates a more complete chemical breakdown of pollutants contained in the gaseous emission stream. In addition, the supplemental airflow increases the flow rate of the emission stream, which results in improved arcing from the electrode 15 to metal tube 14. As such, the air pump 13 improves the overall efficiency of the apparatus 10.

Figure 5:
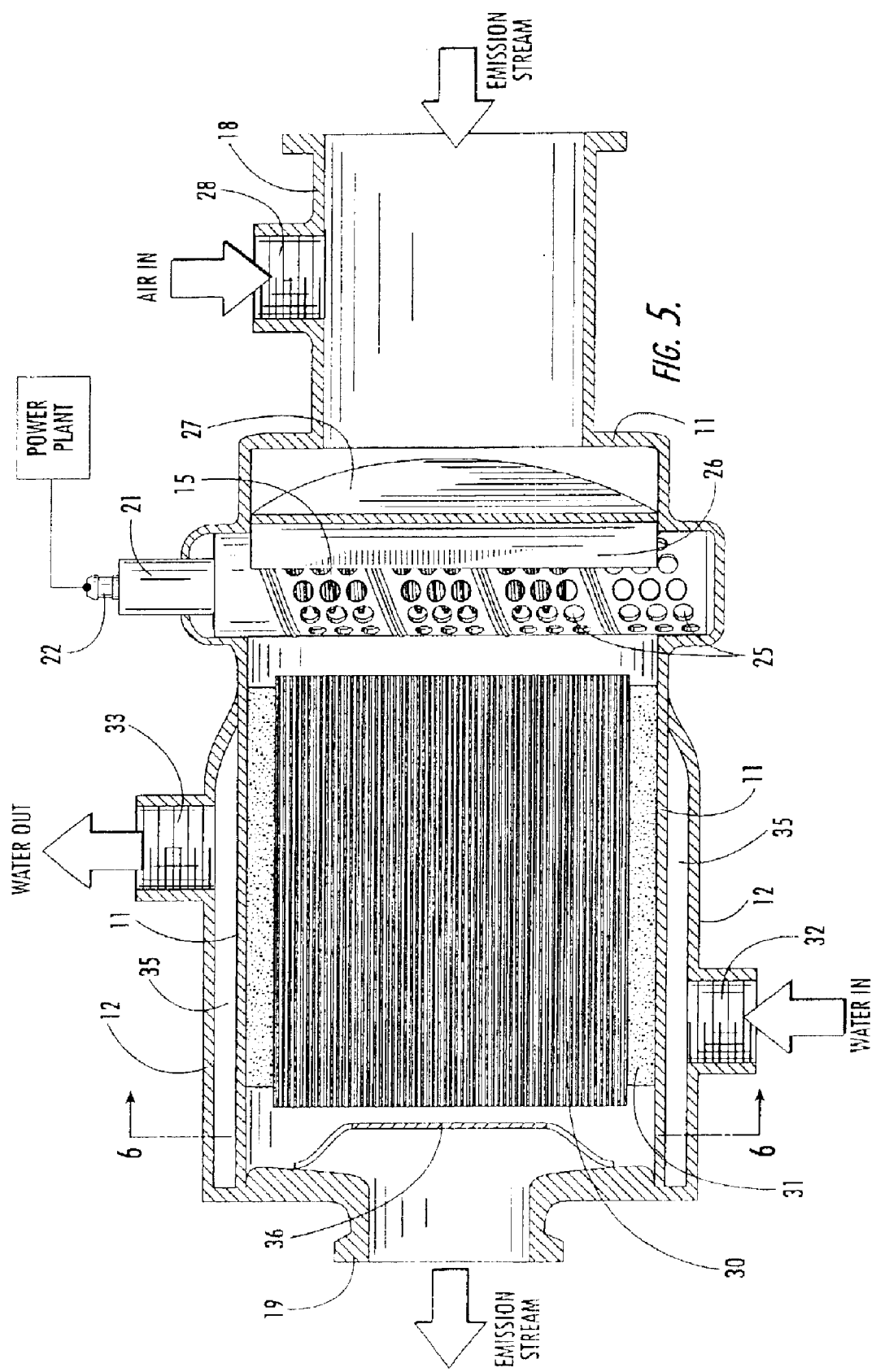
FIG. 5 is a cross sectional view of the preferred emission control apparatus shown in FIG. 1.
Figure 6:
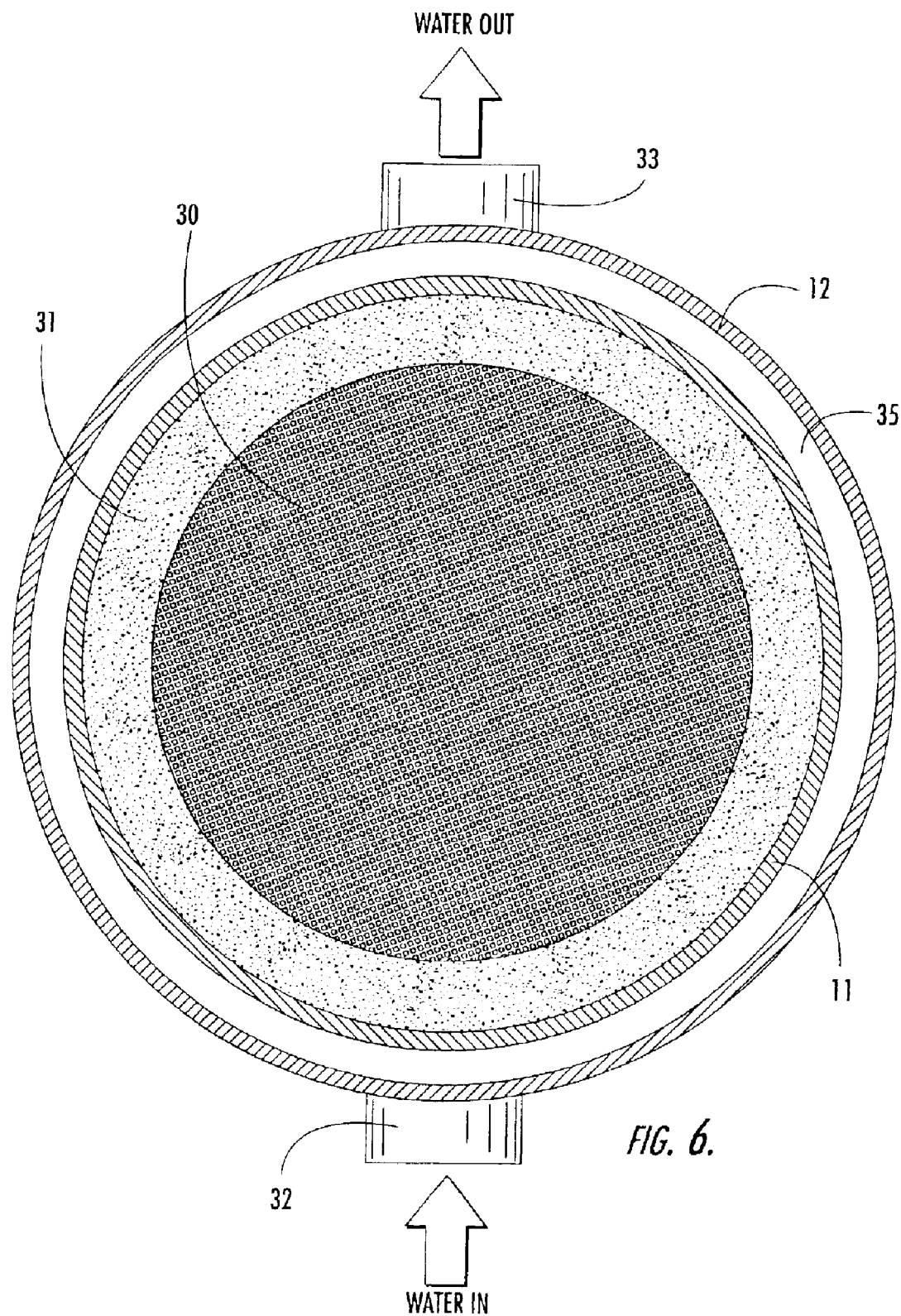
FIG. 6 is a cross sectional view of the preferred emission control apparatus shown in FIG. 5 along lines 6—6.

As shown in FIGS. 2, 5, and 6, a porous chemical substrate 30 is positioned within the treatment chamber 11 downstream from the metal tube 14 and electrode 15. The preferred substrate 30 is a perforated honeycomb material comprised of silica (94.5% by weight), sodium oxide (2.15%), alumina (2.1%), magnesia (1.2%), calcium oxide (0.02%), and iron oxide (0.03%). The substrate 30 is porous so that the gaseous emission stream flows through the substrate 30. The substrate 30 is cylindrical with a diameter slightly smaller than the treatment chamber 11. Between the substrate 30 and the inner wall of the treatment chamber 11 is a layer of asbestos 31 that cushions the substrate 30 and protects it from abrasions. The gaseous emission stream, after having traveled through the metal tube 14 and undergone the initial voltage induced chemical reaction, subsequently travels through the substrate 30 where a complete chemical breakdown of pollutants contained within the gaseous emissions takes place. For instance, carbon monoxide flowing through the substrate 30 is oxidized to produce carbon dioxide. The substrate 30 significantly improves the performance and efficiency of the apparatus 10. For a further explanation of the substrate 30 and the chemical reaction taking place within the substrate 30, applicant refers to U.S. Pat. No. 5,419,123, which is incorporated herein.

As can best be seen in FIG. 2, the manifold 12 is substantially similar in shape to the treatment chamber 11, however, the manifold 12 has a slightly shorter length and slightly larger diameter than the treatment chamber 11. The treatment chamber 11 is positioned within the manifold 12 such that the portion of the treatment chamber 11 containing the substrate 30 is contained within the manifold 12, while the portion containing the metal tube 14 and electrode 15 are not. The manifold 12 includes an inlet port 32 for receiving a flow of water and an outlet port 33 for exiting the flow of water, shown in FIGS. 2 and 5. The flow of water is supplied by a water pumping apparatus integral with the generator engine 17 that is connected to the inlet port 32 by a tube 34, shown in FIG. 8. When used in freshwater, the water pumping apparatus is an open apparatus that supplies water to the manifold 12 directly from the freshwater source. When used in salt water, the water pumping apparatus 39 is a closed apparatus that supplies water from the radiator of the generator engine 17. The water flow is introduced into the manifold 12 through the inlet port 32 and flows within the space 35 between the treatment chamber 11 and the manifold 12 before exiting through the outlet port 33. The water flow cools the temperature of the treatment chamber 11, preferably to the range of from 300° to 150° Fahrenheit, which is the optimum range of temperature in which to operate the apparatus 10.

Figure 7:
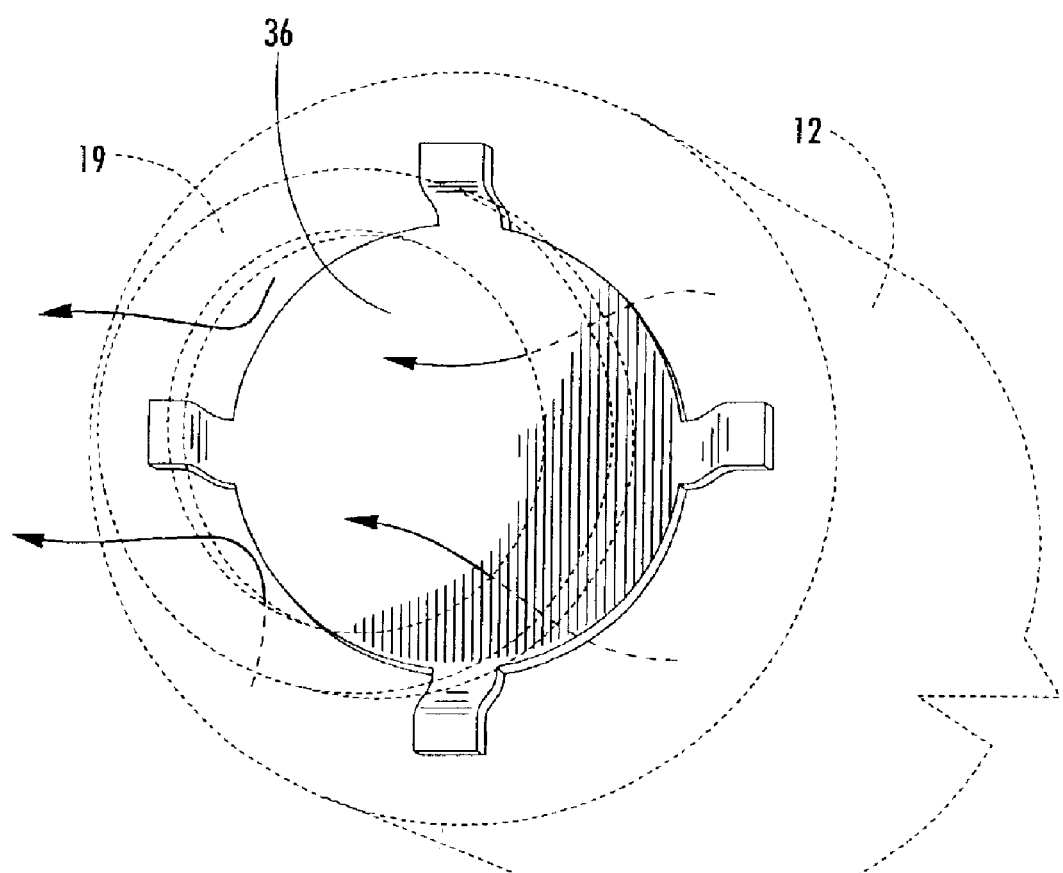
FIG. 7 is a partial phantom view of the preferred emission control apparatus shown in FIG. 1.

As shown in FIGS. 2 and 5, the manifold 12 has an exit opening through which the exhaust pipe 19 of the treatment chamber 12 extends outward and into the atmosphere. After the gaseous emission stream has passed through the substrate 30 it flows toward the exhaust pipe 19. Positioned immediately in front of the exhaust pipe 19 is a retention plate 36. The retention plate 36 is connected to the inner surface of the treatment chamber 11 and covers a substantial portion, but not all, of the opening defined by the exhaust pipe 19, as shown in FIG. 7. This retards the flow of the gaseous emission stream proximate the substrate 30 to ensure a complete chemical reaction and breakdown of pollutants within the substrate 30. Finally, the gaseous emission stream exits the apparatus 10 through exhaust pipe 19 and enters the atmosphere with a greatly reduced concentration of pollutants than when it initially entered the apparatus 10. A substantial portion of the carbon monoxide and hydrocarbons in the gaseous emissions entering the apparatus 10 are converted into carbon dioxide, oxygen, water vapor, and free carbon. Applicants have found that a typical carbon monoxide concentration of 50,000 parts per million in the gaseous emissions of a marine generator engine not using the apparatus 10 is significantly reduced to twenty-five parts per million when operated in conjunction with the apparatus 10.

Figure 9:
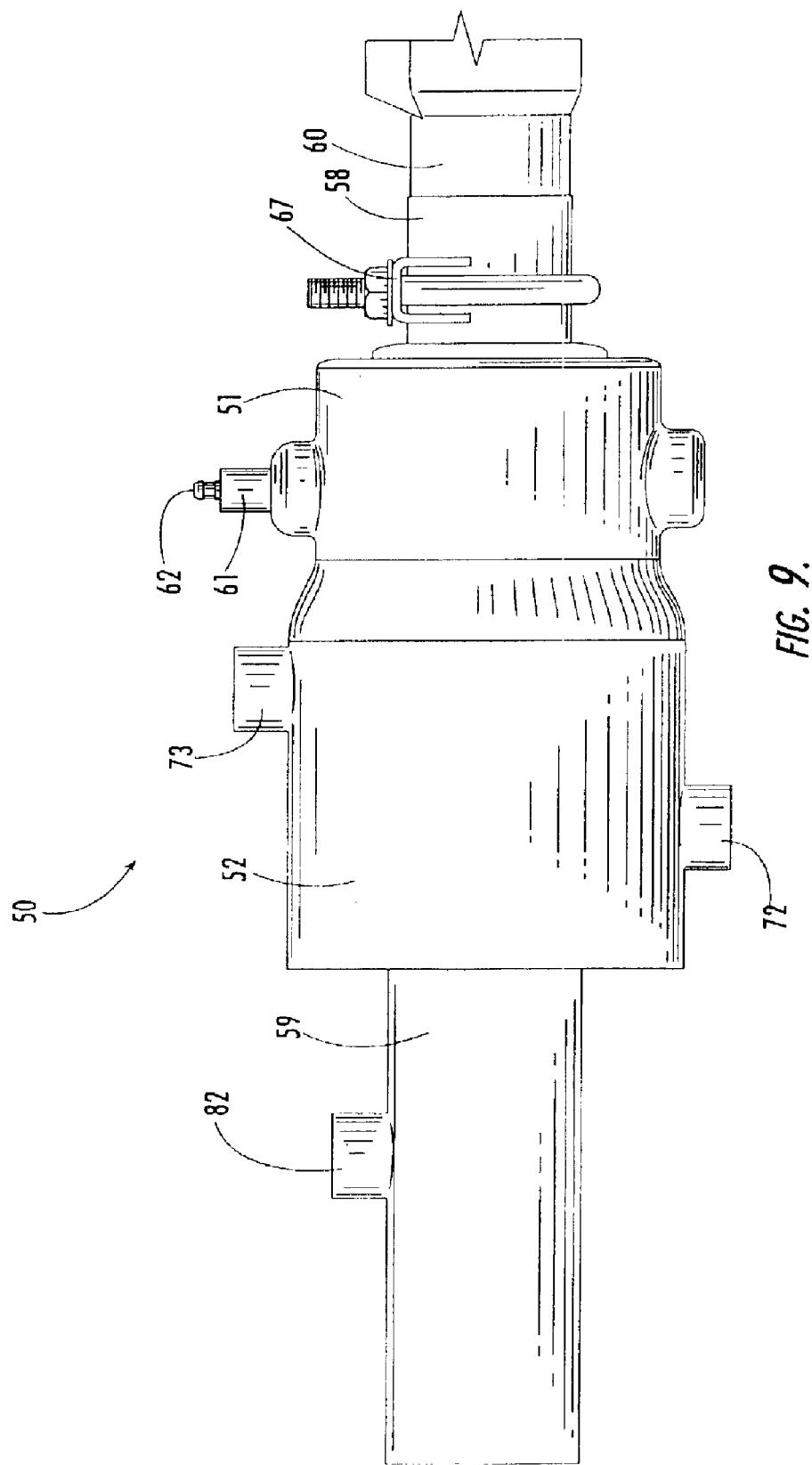
FIG. 9 is a side elevation of another preferred embodiment of an emission control apparatus according to the invention.
Figure 10:
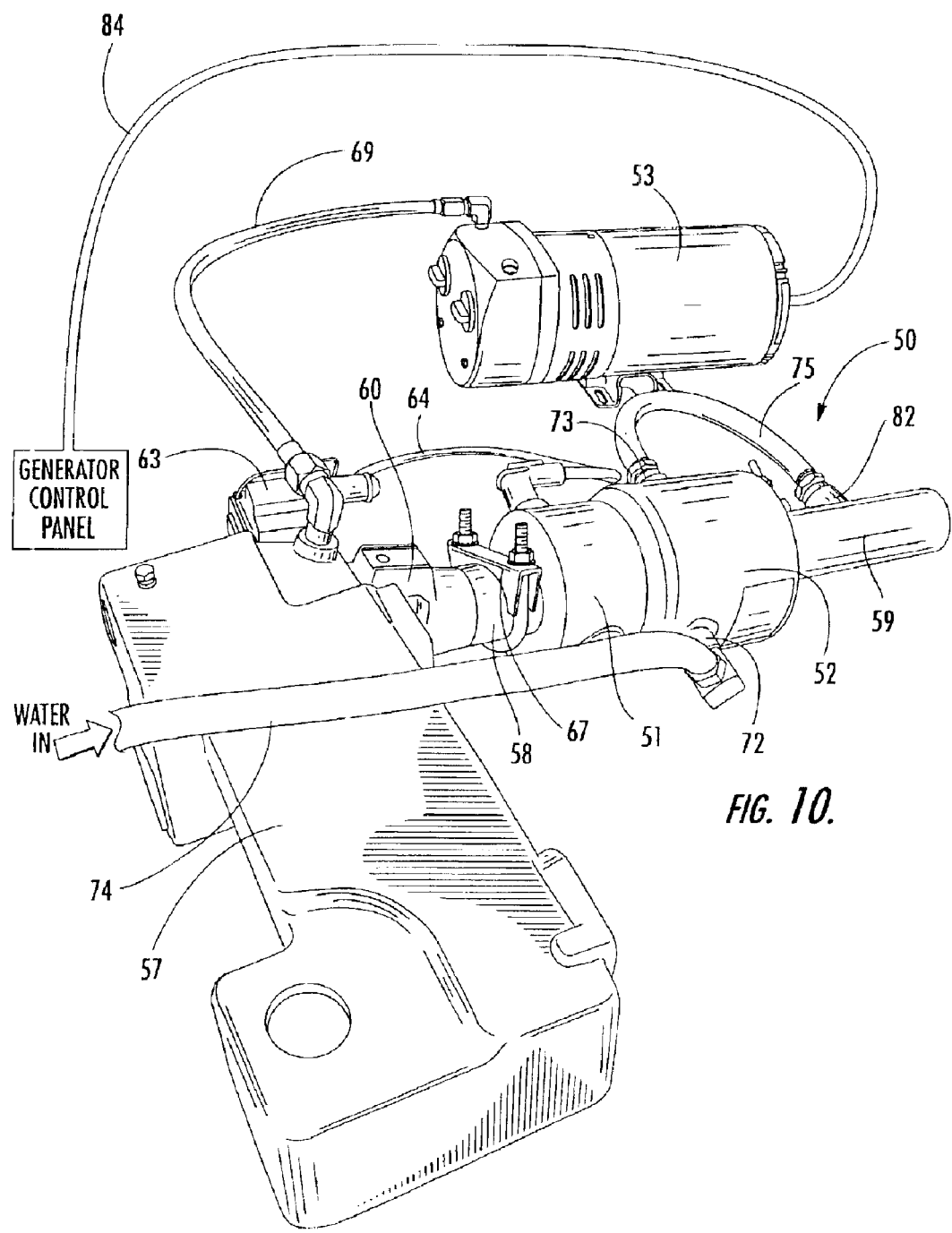
FIG. 10 is an environmental view of the preferred emission control apparatus shown in FIG. 9.

Another preferred embodiment of an emission control apparatus according to the invention is illustrated in FIGS. 9 and 10, and shown generally at reference numeral 50. The emission control apparatus 50 is similar in most respects to the above described emission control apparatus 10, however is configured particularly for use on small and mid-sized recreational boats, such as speed boats and cruisers. As shown in FIGS. 9 and 10, the emission control apparatus 50 comprises a treatment chamber 51 positioned within a manifold 52, and an air pump 53. As in emission control apparatus 10, apparatus 50 includes a threaded ignitor cap 62 affixed on the top of an electrode, which extends above a ceramic insulator 61. The electrode is operatively connected to a power unit 63 by a cord 64. The power unit 63 is connected to the electrical apparatus of the generator engine 57 and supplies a voltage to the electrode, which functions identically as in emission control apparatus 10 described above. Because the emission control apparatus 50 is structurally and functionally similar to emission control apparatus 10, it will not be described in detail except for the following structural differences.

As shown in FIGS. 9 and 10, the emission control apparatus 50 includes an intake pipe 58 which is telescopically positioned over a segment of the exhaust manifold 60 on an electric generator engine 57. A U-shaped bolt clamp 67 is positioned around the intake pipe 58. The clamp 67 is tightened to concentrically force the intake pipe 58 firmly against the manifold 60 to form a tight seal. In addition, a heat resistant exhaust sealant can be used to further enhance the seal between the intake pipe 58 and manifold 60.

As shown in FIG. 10, the manifold 60 of the generator 57 includes an air intake port 68 for receiving a supplemental stream of air supplied by the air pump 53. An air tube 69 is connected at opposite ends to the air pump 53 and the intake port 68. The air pump 53 is powered by a voltage, preferably 110 volts, supplied by the generator engine 57. An electrical cord 84 connects the air pump 53 to the generator's control panel. The air pump 53 supplies a supplemental air source to the manifold 60, diluting the gaseous emission stream entering the intake pipe 58. The air pump 53 preferably supplies air at a rate of five to ten cubic feet per minute.

The manifold 52 includes an inlet port 72 for receiving a flow of water and an outlet port 73 for exiting the flow of water, as shown in FIG. 9. The flow of water is supplied by a water pumping apparatus integral with the generator engine 17 that is connected to the inlet port 72 by a tube 74, shown in FIG. 10. As in emission control device 10, the water flow is introduced into the manifold 52 through the inlet port 72 and flows within the space between the treatment chamber 51 and the manifold 52 to cool the treatment chamber 51 before exiting through the outlet port 73. The emission control device 50 includes an elongate exhaust pipe 59 extending outward from the downstream end of the treatment chamber 51 through which the treated gaseous emissions exit the apparatus 50. As shown in FIG. 10, a tube 75 is connected to the outlet port 73 on the manifold 52 and an inlet port 82 on the exhaust pipe 59 to deliver the flow of water exiting the manifold 52 into the exhaust pipe 59 thereby diluting the stream of gaseous emissions exiting the apparatus 50 and facilitating its movement away from the boat on which the apparatus 50 is mounted. Applicants have found that a carbon monoxide concentration of approximately 170,000 parts per million in the gaseous emissions of a marine generator engine not using the apparatus 50 is significantly reduced to less than 100 parts per million when operated in conjunction with the apparatus 50.

An emission control apparatus and a method for reducing pollutants in the gaseous emissions of an internal combustion engine are disclosed above. Various embodiments of the invention can be made without departing from its scope. Furthermore, the foregoing description of the preferred embodiments of the invention and the best mode for practicing the invention are provided for the purpose of illustration only and not for the purpose of limitation—the invention being defined by the following claims.

We claim:

1. An apparatus for reducing pollutants in internal combustion engine emissions, comprising:

(a) a treatment chamber having an intake opening and an exhaust opening, said intake opening for receiving a stream of gaseous emissions from the engine, said exhaust opening for exhausting the stream of gaseous emissions from said chamber;

(b) a metal tube disposed within said treatment chamber;

(c) an electrode disposed within said metal tube in spaced apart relation to said metal tube, said electrode encircled by said metal tube so that, upon applying a voltage to said electrode, an arc is generated across the space between said electrode and said metal tube, said metal tube providing potential points of contact for the arc around the periphery thereof; and (d) arc generating means for generating the arc from said electrode to said metal tube at a predetermined frequency to promote a chemical reaction reducing the concentration of pollutants in the stream within said treatment chamber.

2. An apparatus for reducing pollutants in internal combustion engine emissions, according to claim 1, wherein said arc generating means comprises a voltage source operatively connected to an ignitor cap mounted on said electrode, and a pulsing mechanism operatively configured with said voltage source to cause the voltage supplied to said electrode to be pulsed at the predetermined frequency.

3. An apparatus for reducing pollutants in internal combustion engine emissions according to claim 1, wherein said metal tube is perforated to allow passage of the stream of gaseous emissions therethrough, and said electrode comprises a threaded rod.

4. An apparatus for reducing pollutants in internal combustion engine emissions according to claim 1, further comprising:

(a) an outer chamber having first and second openings at opposing lateral ends of said outer chamber, said outer chamber further including an inlet port for receiving a flow of water and an outlet port for exiting the flow of water, at least a portion of said treatment chamber contained within said outer chamber, said treatment chamber positioned such that said intake opening is linearly aligned with said first opening and said exhaust opening is linearly aligned with said second opening, said treatment chamber and said outer chamber defining a space therebetween wherein the flow of water cools said treatment chamber; and (b) a water supply connected to said inlet port for introducing the flow of water into said outer chamber.

5. An apparatus for reducing pollutants in internal combustion engine emissions according to claim 1, further comprising an intake pipe connected to said treatment chamber proximate the intake opening for engaging an exhaust manifold of a marine electric generator engine and receiving the stream of gaseous emissions exiting the exhaust manifold.

6. An apparatus for reducing pollutants in internal combustion engine emissions according to claim 5, further comprising a supplemental air source connected to said intake pipe for supplying air thereto for diluting the stream of gaseous emissions within the apparatus.

7. An apparatus for reducing pollutants in internal combustion engine emissions according to claim 6, wherein said apparatus is configured to be mateable with an exhaust apparatus of an electric generator engine on a houseboat.

8. An apparatus for reducing pollutants in internal combustion engine emissions according to claim 7, wherein said supplemental air source comprises an air pump mounted in place of the generator engine's alternator, and is belt driven by a crankshaft on the generator engine.

9. An apparatus for reducing pollutants in internal combustion engine emissions comprising:

(a) a treatment chamber having an intake opening and an exhaust opening at opposing lateral ends of said treatment chamber, said intake opening for receiving a stream of gaseous emissions, said exhaust opening for exhausting the stream of gaseous emissions from said chamber;

(b) a metal tube disposed within said treatment chamber;

(c) an electrode disposed within said metal tube in spaced apart relation to said metal tube, said electrode encircled by said metal tube so that, upon applying a voltage to said electrode, an arc is generated across the space between said electrode and said metal tube, said metal tube providing potential points of contact for the arc around the periphery thereof;

(d) arc generating means for generating the arc from said electrode to said metal tube at a predetermined frequency to promote a chemical reaction reducing the concentration of pollutants in the stream within said treatment chamber; and (e) an intake pipe having opposed first and second ends, said first end connected to said treatment chamber proximate the intake opening and said second having a flange for mateably engaging an exhaust manifold of the engine.

10. An apparatus for reducing pollutants in internal combustion engine emissions according to claim 9, wherein said apparatus is configured to be mateable with an exhaust apparatus of an electric generator engine on a houseboat.

11. An apparatus for reducing pollutants in internal combustion engine emissions, comprising:

(a) a treatment chamber having an intake opening and an exhaust opening, said intake opening for receiving a stream of gaseous emissions, said exhaust opening for exhausting the stream of gaseous emissions from said chamber;

(b) a metal tube disposed within said treatment chamber;

(c) an electrode disposed within said metal tube in spaced apart relation to said metal tube, said electrode encircled by said metal tube so that, upon applying a voltage to said electrode, an arc is generated across the space between said electrode and said metal tube, said metal tube providing potential points of contact for the arc around the periphery thereof;

(d) arc generating means for generating the arc from said electrode to said metal tube at a predetermined frequency to promote a chemical reaction reducing the concentration of pollutants in the stream within said treatment chamber; and (e) an intake pipe connected to said treatment chamber proximate the intake opening for telescopically positioning over a segment of an exhaust manifold of the engine and receiving the stream of gaseous emissions exiting the engine through the exhaust manifold.

12. An apparatus for reducing pollutants in internal combustion engine emissions according to claim 11, further comprising a U-shaped bolt clamp for positioning about said intake pipe and tightening said intake pipe against the exhaust manifold.

13. An apparatus for reducing pollutants in internal combustion engine emissions according to claim 11, wherein said apparatus is configured to be mateable with an exhaust apparatus of a marine electric generator engine.

14. An apparatus for reducing pollutants in internal combustion engine emissions according to claim 11, further comprising a supplemental air source for connecting to the engine exhaust manifold, said supplemental air source supplying air for diluting the stream of gaseous emissions exiting the engine through the exhaust manifold.

15. An apparatus for reducing pollutants in internal combustion engine emissions according to claim 14, wherein said apparatus is configured to be mateable with an exhaust apparatus of an electric generator engine on a small or mid-sized boat, and said supplemental air source comprises an air pump powered by a voltage provided by the generator.

16. An apparatus for reducing pollutants in internal combustion engine emissions according to claim 11, further comprising an exhaust pipe connected to said treatment chamber proximate the exhaust opening for exiting the stream of gaseous emissions from said treatment chamber, said exhaust pipe defining an inlet port for receiving a flow of water for mixing with the stream of gaseous emissions exiting through said exhaust pipe.

17. An apparatus for reducing pollutants in internal combustion engine emissions according to claim 16, further comprising:
  (a) an outer chamber having first and second openings at opposing lateral ends of said outer chamber, said outer chamber further including an inlet port for receiving a flow of water and an outlet port for exiting the flow of water, at least a portion of said treatment chamber contained within said outer chamber, said treatment chamber positioned such that said intake opening is linearly aligned with said first opening and said exhaust opening is linearly aligned with said second opening, said treatment chamber and said outer chamber defining a space therebetween wherein the flow of water cools said treatment chamber; and
  (b) water supply means connected to said inlet port for introducing the flow of water into said outer chamber.

18. An apparatus for reducing pollutants in internal combustion engine emissions according to claim 17, further comprising a tube connecting the outlet port of said outer chamber to the inlet port of said exhaust pipe for delivering the flow of water into said exhaust pipe.

19. A method for reducing pollutants in internal combustion engine emissions comprising the steps of:
  (a) providing an apparatus comprising:
    (i) a treatment chamber having an intake opening and an exhaust opening, said intake opening for receiving a stream of gaseous emissions, said exhaust opening for exhausting the stream of gaseous emissions from said chamber,
    (ii) a metal tube disposed within said treatment chamber,
    (iii) an electrode disposed within said metal tube in spaced apart relation to said metal tube, said electrode encircled by said metal tube so that, upon applying a voltage to said electrode, an arc is generated across the space between said electrode and said metal tube, said metal tube providing potential points of contact for the arc around the periphery thereof, and
    (iv) arc generating means for generating the arc from said electrode to said metal tube at a predetermined frequency to promote a chemical reaction reducing the concentration of pollutants in the stream within said treatment chamber;
  (b) connecting said intake opening to an exhaust manifold of the engine so that a stream of gaseous emissions passes from the exhaust manifold through said intake opening into said treatment chamber; and
  (c) applying the voltage pulsed at a predetermined frequency to said electrode to generate the chemical reaction with the stream of gaseous emissions as the stream passes proximate said metal tube to reduce the concentration of pollutants in the stream.

20. A method for reducing pollutants in the gaseous emissions according to claim 19, further comprising the step supplying a supplemental stream of air to said treatment chamber for diluting the stream of gaseous emissions within said treatment chamber.

21. A method for reducing pollutants in the gaseous emissions according to claim 19, wherein said apparatus comprises an intake pipe connected to said treatment chamber proximate the intake opening, and the step of connecting said intake opening to an exhaust manifold of the engine comprises telescopically positioning the intake pipe over a segment of the exhaust manifold.

22. A method for reducing pollutants in the gaseous emissions according to claim 20, wherein the step of connecting said intake opening to an exhaust manifold of the engine further comprises positioning a U-bolt clamp about said intake pipe and tightening said clamp to frictionally engage said intake pipe against the exhaust manifold.

* * * * *